No. 883,875. PATENTED APR. 7, 1908.
J. E. GRAYBILL.
MACHINE FOR MANUFACTURING MOUNT TUBES.
APPLICATION FILED OCT. 20, 1903.
3 SHEETS—SHEET 3.
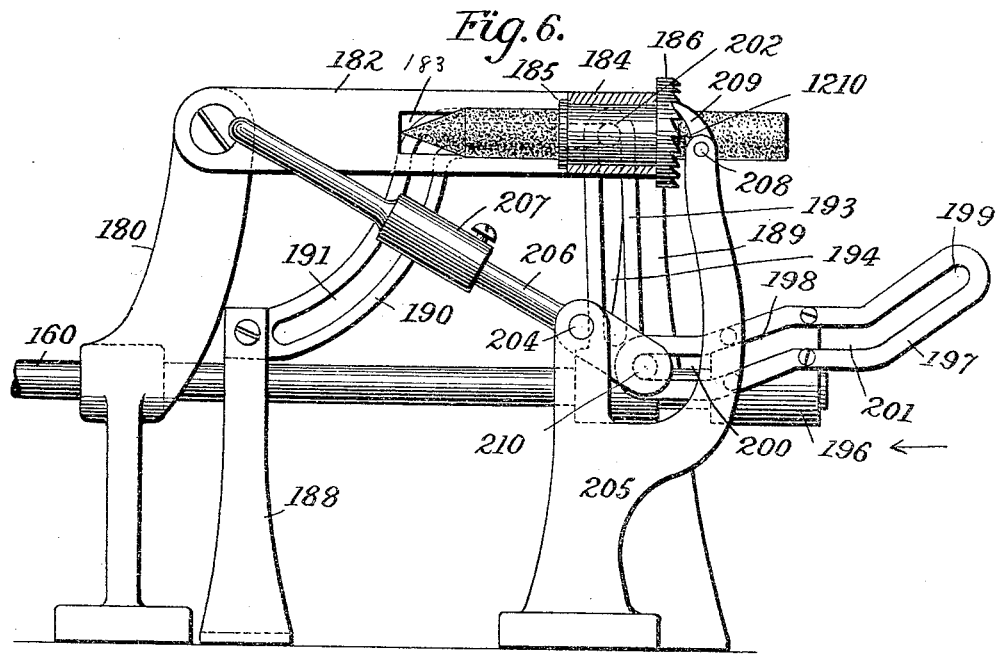
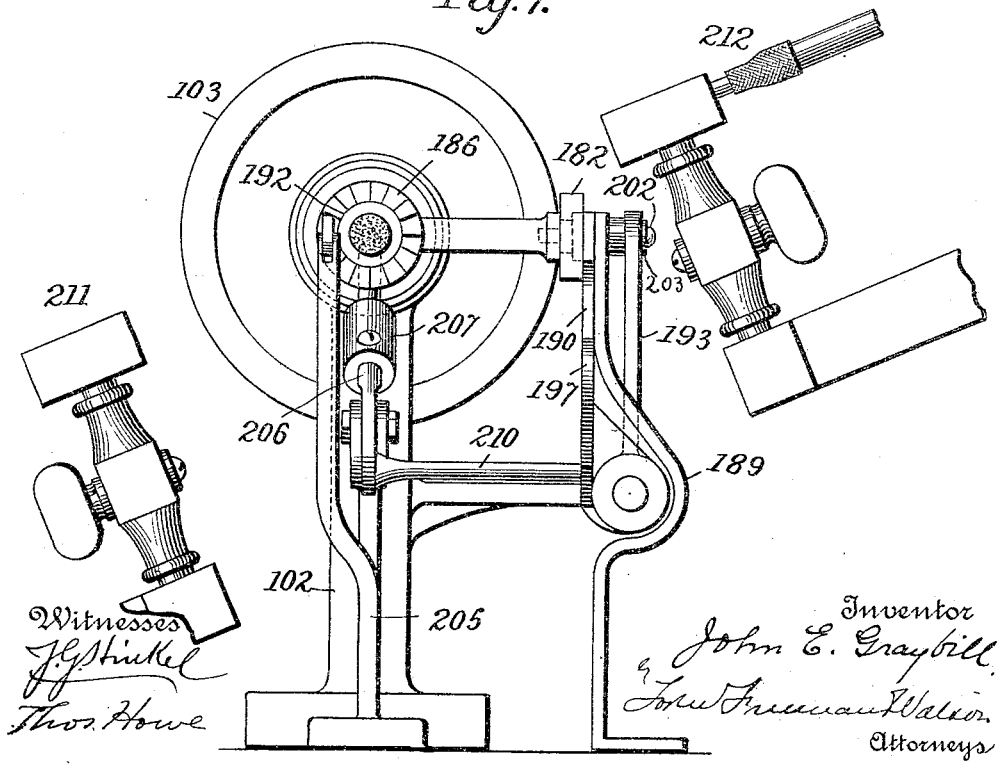

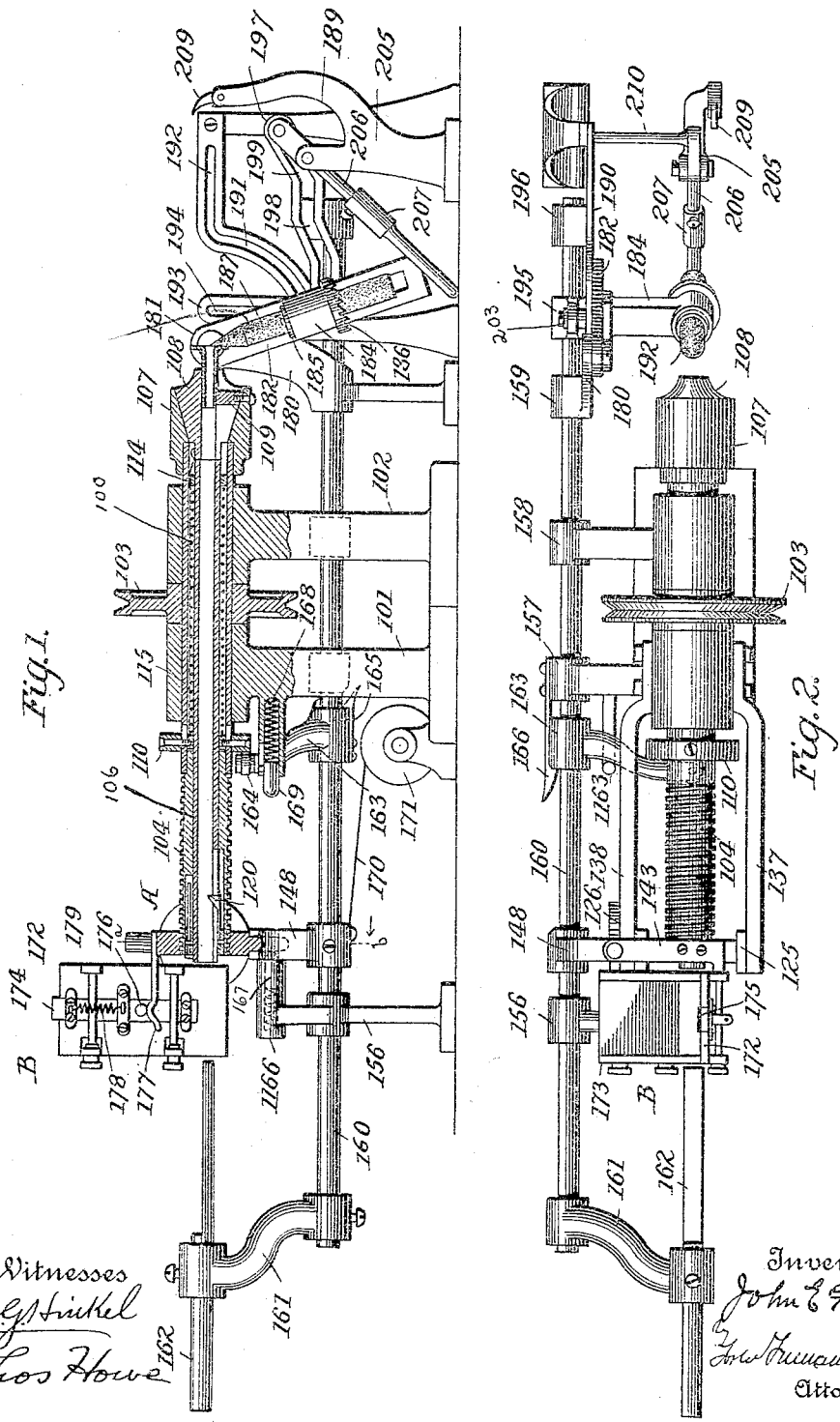

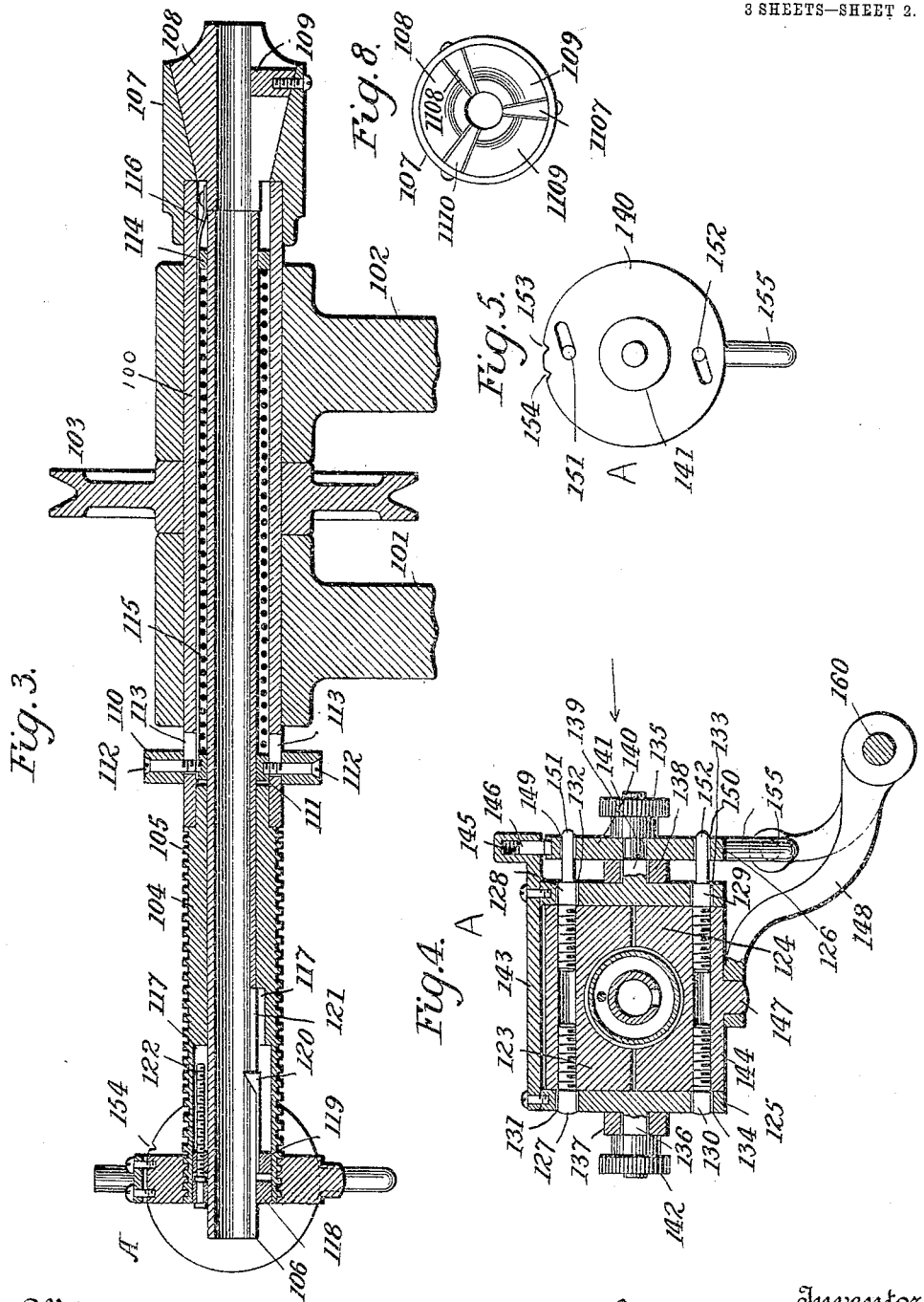

UNITED STATES PATENT OFFICE.

JOHN E. GRAYBILL, OF YORK, PENNSYLVANIA, ASSIGNOR TO GENERAL ELECTRIC COMPANY, A CORPORATION OF NEW YORK.

MACHINE FOR MANUFACTURING MOUNT-TUBES.

No. 883,875.  Specification of Letters Patent.  Patented April 7, 1908.

Application filed October 20, 1903. Serial No. 177,801.

*To all whom it may concern:*

Be it known that I, JOHN E. GRAYBILL, a citizen of the United States, residing at York, York county, Pennsylvania, have invented certain new and useful Improvements in Machines for Manufacturing Mount-Tubes, of which the following is a specification.

This invention relates to machines for manufacturing incandescent lamps and particularly to that portion of the lamp which is known as the mount. The mount is that portion of the lamp which is located within the base of the bulb and serves to support the filament and anchor wires, being compressed or otherwise formed about them. Before forming about the wires which it supports, the mount is simply a short tube having a flange at one end which is known as a mount tube. Heretofore these tubes have been manufactured from cylindrical tubes by turning up the flanges by hand. This is a laborious and expensive process and it is the object of this invention to provide a machine which will automatically produce mount tubes from cylindrical tubes.

The invention can be best described in connection with the accompanying drawings of which—

Figure 1 is a side elevation partly in section of a machine embodying the invention; Fig. 2 is a top plan view; Fig. 3 is an enlarged view of a portion of Fig. 1; Fig. 4 is an enlarged section on line a—b of Fig. 1, looking in the direction of the arrow; Fig. 5 is an end view of the apparatus shown in Fig. 4 looking in the direction of the arrow; Fig. 6 is an enlarged side elevation of the flanging apparatus shown at the right of Fig. 1; Fig. 7 is an end view of the flanging apparatus looking in the direction of the arrow of Fig. 6; and Fig. 8 is an end view of the chuck.

The hollow shaft 100 is supported by the pedestals 101 and 102 in such manner that it may turn, and rigidly secured to said shaft is the driving pulley 103. Secured to shaft 100 so as to turn therewith, is another shaft 104 having threads 105 cut upon its outer surface. Fitted within the shafts 100 and 104 is the tube 106. The chuck guide 107 is rigidly secured upon one end of shaft 100 and within the conical opening of the guide are the chuck jaws 108, 109 and 1109. The jaws 108, 109 and 1109 are adapted to move out of and into the guide and by their engagement with its conical sides are caused upon their inward movement to grip any object which may be between them and when they are moved outwardly the object will be released. The jaws are separated by the pieces 1107, 1108 and 1110 which are rigidly secured to guide 107 and serve as guides for the jaws and prevent them from turning in guide 107. The collar 110 is slidably mounted upon shaft 100 and is rigidly connected to collar 111, which is slidably mounted on tube 106, as by means of screws 112 which extend through slots 113 in shaft 100.

Secured against longitudinal movement on tube 106 is collar 114 and upon tube 106 and abutting against collars 111 and 114 is spring 115. The jaws are each connected to collar 111 by a metal strap at 116, which passes through recesses in the collar 114. A recess 117 is formed in the end of shaft 104 and within said recess and secured against longitudinal movement is a collar 118. Also mounted within the recess 117 is the collar 119 which is movable longitudinally upon tube 106 and carries the latch 120 the point of which projects through slot 121 of said tube into its interior. The collar and therefore the latch are adjustable by means of the screw 122 which is longitudinally fixed but is rotatable in collar 118 and engages in a threaded hole in collar 119. A split nut A is adapted to engage with threads 105 on shaft 104. This nut is best shown in Figs. 4 and 5. It comprises the two halves 123 and 124 divided by a horizontal plane and movable laterally toward and away from shaft 104 between the guide walls 125 and 126. Tapped into the nut are the guide pins 127, 128, 129 and 130 which slide in the vertical slots 131, 132, 133 and 134 cut in the guide walls, the guide pins being square in section where they engage with the guide walls. Extending from the sides of walls 125 and 126 are the projections 135 and 136 which are embraced by the guide bars 137 and 138 which guide the nut in its travel. The projection 135 extends beyond the guide bar 138 and forms a bearing 139 on which the plate 140 may turn and is threaded at its end to receive the thumb nut 141. The projection 136 is similarly threaded to receive the nut 142.

The walls 125 and 126 are secured together at top and bottom by the plates 143 and 144. The top plate 143 has an extension 145 in which is mounted the spring pressed pawl 146. The lower plate 144 has the projection 147 which enters a socket in the arm 148. The plate 140 has the two cam holes 149 and 150 which receive the pins 151 and 152 projecting from the guide pins 128 and 129 respectively, the holes being so made that revolution of the plate operates to shift both pins 151 and 152 toward or away from the center and thereby to separate or bring together the two halves 123 and 124 of the nut and disengage or engage it with the threads 105. Upon the circumference of plate 140 are formed the two notches 153 and 154 which engage with the pawl 146 to hold the plate in such positions that the pins 151 and 152 will lie at the extremities of the cam holes. To the bottom of plate 140 is secured the buffer projection 155 which is adapted to turn the plate on its bearing by coming in contact with a fixed portion of the machine.

Supported in suitable bearings as 156, 157, 158 and 159 so that it may have longitudinal movement is a shaft 160 to which are fixed the arms 161 and 148, the arm 161 having the feed rod 162 secured in it so that the rod is in line with tube 106 while the arm 148 engages with the nut as before described. The shaft 160 also carries the arm 163 which is movable lengthwise upon the shaft.

1163 is a stop for limiting the left hand travel of arm 163. Arm 163 carries a roller 164 adapted to engage with the side of collar 110 and also a spring latch 165 adapted to engage with a notch in shaft 160. Fixed to bearing 157 is another spring latch 166 adapted to engage with arm 163. Supported from bearing 156 is the fixed buffer piece 1166 carrying the spring pressed plunger 167 and fixed to the pedestal 101 is a similar buffer piece 168 and plunger 169 all of which are adapted to engage with the projection 155 of nut A. The arm 148 is connected by means of a band or cord 170 with a power storing device 171 which may be a weight or a spring barrel and in which power is stored by the left hand movement of nut A. Located at one end of the tube 106 and between it and the feed rod is a hopper B to receive the cylindrical tubes of which the mount tubes are to be formed. The sides 172 and 173 of the hopper converge toward the bottom at which point there is room for but one of the tubes and holes are provided in the ends of the hopper so that the feed rod 162 may enter the hopper at one end to push a tube out of the hopper at the other end and into tube 106. In order to prevent the tubes in hopper B from becoming clogged and thus preventing their feeding to the bottom of the hopper, an agitator is provided which comprises a slide 174 inserted in guides in one side of the hopper with which slide the glass tubes come in contact. The slide may have that portion which comes in contact with the tubes covered by corrugated rubber as at 175 so that the agitation of the tubes and their successive feeding to the bottom of the hopper will be insured. The slide carries a pin 176 adapted to engage with the cam arm 177 secured to nut A. The spring 178 is secured at one end to the slide and at the other to the bracket 179 fixed to the side of the hopper.

Secured to bearing 159 is an arm 180 which at 181 has pivoted to it the member 182. In 182 is cut the longitudinal slot 183 in which the carriage 184 is mounted so that it may have movement lengthwise of the slot. Within the carriage 184 is placed sleeve 185 which is shouldered against both ends of the carriage and therefore cannot have longitudinal movement with relation thereto but may be rotated. To one end of sleeve 185 is fixed ratchet wheel 186 and within the sleeve the flanging rod 187 preferably of carbon, is fixed. The flanging rod is pointed at one end as shown. Rigidly supported on standards 188 and 189 is the member 190 in which is a slot composed of the portions 191 which is an arc about 181 as a center, and the horizontal portion 192. Rigidly secured to shaft 160 at 195 is the member 193 having the vertical slot 194 and at 196 the member 197, having the slot composed of the inclined portions 198 and 199 and the horizontal portions 200 and 201, is also rigidly secured to that shaft. The stud 202 projects from carriage 184 through the slots in members 190 and 193 and is movably secured thereto by the nut 203 threaded on said stud on the opposite side of the members from the carriage. Pivotally supported at 204 on standard 205 is the discharge rod 206 which may be adjusted in length by means of the plug and socket joint 207. A pin 210 is fixed to rod 206 and the end of the pin enters the slot in member 197. At 208 is pivoted a pawl 209 adapted to engage with ratchet wheel 186. Pawl 209 is given a tendency to turn toward the left upon its pivot 208 by means of a spring or otherwise and the motion due to this tendency is limited by a suitable stop as 1210. 211 and 212 indicate gas burners so supported and located that their flames play upon a point near the mouth of the chuck.

Having described the machine, its operation will now be outlined. Before starting the machine into operation a quantity of cylindrical glass tubes of the proper length are placed in hopper B and the tube 106 is filled with them continuously from the latch 120 to the end of the chuck and somewhat beyond it. The amount of the projection beyond the chuck by the end tube may be adjusted by means of the screw 122. In the position of the machine shown in Fig. 1, the manufacture of a mount tube is nearly completed and the nut is nearly at the left hand end of its travel. The plunger 167 is pressed against its spring by the projection 155 on plate 140 on nut A and the nut is in engagement with threads 105 on shaft 104 as the spring of plunger 167 is not strong enough to force pawl 146 out of notch 153. A slight turn of pulley 103 however, will force projection 155 against the fixed buffer piece 1166. The pawl 146 will then be forced out of notch 153 when the plunger 167 under the pressure of its spring will quickly turn the plate 140 about its axis until pawl 146 engages with notch 154. This movement of plate 140 operates by means of the cam slots 149 and 150 to move the pins 151 and 152 radially outward and thus separate the halves of the nut so that they are no longer in engagement with threads 105.

The nut A and the shaft 160 to which it is secured being no longer restrained, will return quickly to the right end of their travel under the influence of the pull exerted by belt 170 which pull is due to the power stored in the motor 171 during the left hand movement of the nut and shaft 160. During this movement of the nut and shaft to the right a number of operations take place. The feed rod 162 is carried to the right with shaft 160 and entering the left hand end of the hopper forces the glass tube lying in its bottom, out at the right hand end into tube 106 and along tube 106 and over the point of latch 120 until the latch point springs up behind it and prevents its backward movement. This operation also causes the glass tubes in tube 106 and in the chuck to be moved one tube length to the right and the completed mount tube to be forced out of the chuck. The chuck jaws are held open during the feeding of the tubes in the following manner: The notch upon shaft 160 with which latch 165 upon arm 163 is adapted to engage is so placed that in the right hand travel of the shaft said latch will come into engagement with it to cause the chuck to be operated a sufficient time before the tube being fed in from the hopper collides with the one just ahead of it. When the latch is thus in engagement, the shaft carries with it the arm 163 and as this arm through roller 164 bears against collar 110, this collar will be forced to the right thereby compressing spring 115 and, through the intervention of strips 116, will push the chuck jaws outward, thereby release the chuck. The right hand movement of arm 163 continues until latch 165 rides upon the hub of bearing 157 and thereby lifts the latch out of engagement with shaft 160. At the point where this occurs the latch 166 on bearing 157 will be in engagement with the hub of arm 163 to prevent it, collar 110 and chuck jaw 108 from being moved to the left by spring 115. As the nut nears its right hand limit of travel, the hub of arm 148 engages with latch 166 to disengage it from the hub of arm 163 which arm then tends to move toward the left under the pressure of spring 115. Also near the right hand end of the nut travel, the projection 155 comes in contact first with plunger 169 and compresses its spring and later when the projection comes against the buffer piece 168, the pawl 146 will be forced out of notch 154 and the plunger urged by its spring will then quickly turn plate 140 until the pawl rests in notch 153. This shifts the pins 151 and 152 to the other extremities of their cam holes in plate 140 and radially nearer to the center of the plate. The two halves of the nut are thus brought together and into engagement with threads 105 on shaft 104. This shaft revolves continuously and on being brought into engagement with the threads upon it, nut A is driven to the left. As the nut and shaft 160 are moving to the right, the members 193 and 197 which are rigidly secured to the shaft move in the same direction. The member 193 carries with it the stud 202 of the flanging rod carriage 184 which stud is guided by the slots in stationary member 190. At the first part of the movement to the right therefore, stud 202 moves in the arc described by slot portion 191 and the carriage 184 maintains a fixed position with relation to the member 182 which turns about its center 181. The result is that flanging rod 187 is turned about an axis perpendicular to the tube until it is in a horizontal position when the stud 202 will enter the horizontal slot portion 192 and being urged to the right by member 193 will cause the carriage 184 to move longitudinally in slot 183 of member 182 and the flanging rod 187 to be horizontally withdrawn from the work. Near the right hand end of the carriage travel the ratchet wheel 186 will engage with pawl 209 and further movement of the carriage causes the ratchet point to be forced upward and thereby to turn wheel 186 and the flanging rod. The object of this is to present a new surface of the rod to the work at each operation so that the rod will be evenly worn.

While the movement of the flanging rod has been taking place, changes in position of the discharge rod 206 have been going on. When the shaft 160 is at the left hand limit of its travel, the pin 210 upon the discharge rod lies at the right hand end of slot portion 199 as shown in Fig. 1. Travel of member 197 to the right with shaft 160 causes pin 210 to be moved downwardly in slot portion 199 and the receiving end of the discharge rod to be elevated. While the pin is in the slot portions 201 the rod is held stationary in a horizontal position but upon entrance of pin 210 into inclined slot portion 198, the receiving end of the discharge rod is again elevated until when the pin is at the left hand end of the portion 198, the receiving end of the rod is in position to receive the completed mount tubes as they are pushed from the chuck. The travel of the pin in the horizontal slot portion 200 maintains the rod in this position and at the end of the right hand travel of shaft 160, the pin will lie in the left hand end of the slot as shown in Fig. 6. After or about the time of the entrance of pin 210 in the horizontal slot portion 200, the glass tube being fed forward by feed rod 162 will collide with those already in the tube 106 and force the completed mount tube out of the chuck upon the receiving end of discharge rod 206, and a new tube is pushed into place to be flanged. During the operation of feeding the glass tubes forward, the chuck is kept open by maintaining the collar 110 in its right hand position by means of the latch 166. The shaft 160 having reached the right hand limit of its travel, the nut A will be thrown into engagement with threads 105 in the manner as described and it will begin its travel to the left, carrying with it the shaft 160. During the travel of the shaft in this direction operation of the various parts takes place as follows: The arm 163, being released from the latch 166, it follows the arm 148 for a short distance under the influence of spring 115 which also acts through collar 110 and straps 116 to draw in the jaws and thus grip the tube contained in the chuck. The left hand movement of arm 163 is limited by coming against the stop 1163. The arm 161 is carried to the left and with it the feed rod 162 which is thus withdrawn from the hopper B and at the left hand limit of movement of shaft 160 will occupy a position as shown in Fig. 1. The member 193 will move with shaft 160 and cause the movement of stud 202 to the left in horizontal slot portion 192 and thus causing movement of the carriage and flanging rod towards the work until the point of the rod enters the end of the tube to be formed. When the rod has been advanced a sufficient distance, the stud 202 will enter the arc shaped slot 191 and the flanging rod will be turned about its point as described in connection with the movement of shaft 160 in the opposite direction but in this case the rod will move down instead of up and in its course will bear against the end of the tube to be flanged and force it outwardly to form the flange. During this operation the tube is continually rotating and its end maintained at the requisite degree of softness by the flames from the gas burners 211 and 212 which play upon it. As the ratchet wheel 186 leaves dog 209, the dog is caused to move to the left by any suitable means against a stop which is so located that the ratchet will be turned the proper amount on its next right hand movement. At the beginning of the left hand movement, discharge rod 206 will occupy the position shown in Fig. 6 and will bear upon its receiving end a completed mount tube. During the first part of the movement the rod will be maintained in the position of Fig. 6 as the pin 210 will be in the horizontal slot portion 200. As the pin traverses the inclined slot portion 198, it will be forced upwardly thus lowering the receiving end of rod 206 until the pin reaches the horizontal portion 201 when the rod will be in a horizontal position and will be so maintained while pin 210 is traversing slot portion 201. The tube upon rod 206 is in this position removed from the heat of the gas flames and by the cessation of the downward movement of the receiving end of the rod is given an opportunity to cool before it is discharged from the rod and from the machine. The end of slot portion 201 having been reached, the pin will then enter upon the inclined portion 199 and will be forced still further upward and the receiving end of the rod downward until when the left hand limit of travel of shaft 160 is reached the pin will be in the right hand extremity of the slot and the rod will occupy the position as shown in Fig. 1 and the completed tube will slide off it and may be received in any suitable receptacle. The movements of the flanging and discharge rods are so timed that they do not interfere with each other.

As the nut nears the left hand end of its travel, the cam arm 177 which it carries comes into engagement with pin 176 and forces slide 174 upward against spring 178 and upon movement of the nut in the opposite direction the slide is again raised in a similar manner thus agitating the glass tubes in hopper B and insuring their proper feeding.

I have now described a complete cycle in the operation of the machine, and the continuous operation is a repetition of such cycles.

Without limiting myself to the precise construction shown and described, I claim:

1. In a tube-flanging machine, the combination with flanging mechanism and a chuck for holding a tube in flanging position, of a positive feed mechanism for forcing a tube into said chuck, and means for adjusting the travel of said feed mechanism to vary the extension of the tube beyond the chuck.

2. In a tube-flanging machine, the combination with flanging mechanism and a chuck for holding a tube in flanging position, of a positive feed mechanism comprising a reciprocating feed rod for forcing a tube longitudinally into the chuck, and means for varying the travel of said feed rod.

3. In a tube-flanging machine, the combination with flanging mechanism and a chuck for holding the tube in flanging position, of a positive feed mechanism comprising a reciprocating feed rod for forcing a tube longitudinally into the chuck, and an adjustable stop for limiting the travel of said feed rod.

4. In a machine for flanging tubes, the combination of a chuck for gripping the tubes, a means for flanging said tubes, a longitudinally movable shaft, a feed-rod carried by said shaft for feeding the tubes, an arm upon said shaft for controlling the gripping of the chuck and a member upon said shaft for operating said flanging means.

5. In a machine for flanging tubes, the combination of a revoluble shaft having threads thereon, means for revolving said shaft, a nut engaging with said threads, means for holding said nut against revolution and a longitudinally movable shaft connected to said nut.

6. In a machine for flanging tubes, the combination of a revoluble shaft, means for revolving said shaft, threads upon said shaft, a nut engaging with said threads, means at one end of the nut travel for disengaging said nut from said threads and means at the other end of the nut travel for causing said nut to engage with said threads.

7. In a machine for flanging tubes, the combination of a split nut, a revoluble shaft, threads upon said shaft adapted to engage with said nut, a plate revoluble about an axis perpendicular to the motion of said nut and having cam holes, a pin projecting from each part of the nut into one of said cam holes, a buffer at one end of the nut travel adapted to collide with said plate and thus move the parts of said nut into engagement with said threads, and a buffer at the opposite end of said travel for moving said nut out of engagement with said threads by colliding with said plate.

8. In a machine for flanging tubes, the combination of a revoluble shaft, a chuck carried thereby, a collar slidably mounted upon said shaft, connections between said chuck and said collar, a spring pressing against said collar and tending to close said chuck, and means adapted to engage with said collar to release said chuck.

9. In a machine for flanging tubes, the combination of a hopper for receiving the tubes, means for agitating the tubes in said hopper, and longitudinally movable means for actuating said agitating means.

10. In a machine for flanging tubes, the combination of a hopper for receiving the tubes, a reciprocating slide for agitating said tubes, a revoluble shaft, threads thereon, a nut adapted to engage with said threads, a spring tending to move said slide in one direction and a cam arm carried by said nut and adapted to engage with said slide to move it in the other direction.

11. In a machine for flanging tubes, the combination of a revoluble shaft, means for revolving said shaft, threads upon said shaft, a nut adapted to engage with said threads and held against motion of rotation, a chuck carried by said shaft, a collar mounted to have longitudinal movement upon said shaft, connections between said collar and said chuck, a longitudinally movable shaft operatively connected to said nut, a plunger carried by said longitudinally movable shaft for feeding the tubes, an arm, also carried by said longitudinally movable shaft, adapted to engage with said collar, means for releasing said nut from said threads at one end of its travel, means for returning said nut to the other end of its travel, and means located at the latter end of the nut travel for moving said nut into engagement with said threads.

12. In a machine for flanging glass tubes, the combination with flanging means, of means for heating the tubes, and discharging means whereby the completed tube is moved from the position in which it is flanged to a point where it is discharged from the machine, said discharging means being so constructed and connected that the tube is arrested in its motion at a point between the flanging and discharging points.

13. In a machine for flanging glass tubes, the combination with flanging means, of means for heating the tubes, and automatic discharging means whereby the completed tube is moved from the position in which it is flanged to a point where it is discharged from the machine, said discharging means being so constructed and connected that the tube is arrested in its motion at a point between the flanging and discharging points.

14. In a machine for flanging glass tubes, the combination with a flanging rod, of a carriage for said rod, said rod being rotatable on its axis, means for moving said carriage, and means for intermittently rotating said rod.

15. In a machine for flanging tubes, the combination of a flanging rod, a pivoted member, a carriage for said rod mounted to have longitudinal movement upon said member, a longitudinally movable actuating member having a vertical slot, a stationary guide member having a slot comprising an arc shaped portion and a horizontal portion and a pin secured to said carriage and passing through the slots in said actuating and guide members.

16. In a machine for flanging tubes, the combination of a flanging rod supported to rotate on its axis, a ratchet wheel secured thereto and a pawl adapted to engage with said ratchet wheel to turn said rod upon each operation of the machine.

17. In a machine for flanging tubes, the combination of a flanging rod supported to revolve on its axis, a ratchet wheel secured thereto and a pawl secured to a stationary part of the machine and adapted to engage with said ratchet wheel.

18. In a machine for flanging tubes, the combination of a pivoted discharge rod having a receiving end, an actuating member having a slot and a pin secured to said rod and projecting into said slot.

19. In a machine for flanging tubes, the combination of a pivoted discharge rod, having a receiving end, a longitudinally movable actuating member having a slot composed of horizontal and inclined portions and a pin secured to said rod and extending into said slot.

20. In a machine for flanging tubes, the combination of a flanging device, a discharging device, a longitudinally movable shaft and actuating members for said devices secured to said shaft.

In testimony whereof I have signed my name to this specification in the presence of two subscribing witnesses.

JNO. E. GRAYBILL.

Witnesses:
B. R. PAXTON,
LILLIAN POMRANING.